3,513,148
ZINC MALEATE-POLYPROPYLENE COMPOSITION
Herbert Naarmann, Ludwigshafen (Rhine), Germany, assignor to Badische Anilin- & Soda-Fabrik Aktiengesellschaft, Ludwigshafen (Rhine), Germany
No Drawing. Filed Sept. 21, 1967, Ser. No. 669,387
Claims priority, application Germany, Oct. 8, 1966, 1,294,662
Int. Cl. C08f *29/02*
U.S. Cl. 260—93.7         1 Claim

ABSTRACT OF THE DISCLOSURE

Polypropylene molding material containing zinc malate can be processed into moldings of relatively high tear resistance and softening point.

---

This invention relates to polypropylene molding materials which can be processed into moldings having relatively high transparency.

Moldings produced from conventional polypropylene molding materials have relatively low transparency.

The object of the present invention is to provide polypropylene molding material which can be processed into moldings having relatively high transparency.

This object is achieved by polypropylene molding material which contains 0.5 to 60, preferably 5 to 15, parts by weight of a salt of an organic unsaturated carboxylic acid with a transition metal and/or a metal of Group II or III of the Periodic System for each 100 parts by weight of polypropylene.

It is surprising that moldings prepared from such molding materials have not only considerably higher transparency, but also higher softening temperatures, improved resistance to organic solvents, better tear resistance, and increased flame retardance, as compared with moldings prepared from comparable conventional materials; in some cases they have the property of polarizing light.

Zinc maleate is particularly suitable as a salt of an unsaturated organic carboxylic acid in accordance with this invention. Other suitable salts are: cadmium itaconate, zinc(II) maleate, lead(II) maleate, vanadium(III) maleate, titanium(III) maleate, chromium(III) maleate and manganese(IV) maleate. Examples of other suitable salts are: copper(I) acrylate, copper(II) acrylate, silver(I) acrylate, gold(I) acrylate, mercury(II) acrylate, germanium(IV) acrylate, aluminum(IV) acrylate, zirconium(IV) acrylate, hafnium(IV) acrylate, thorium(III) acrylate, niobium(III) acrylate, tantalum(III) acrylate, molybdenum(V) acrylate, tungsten(IV) acrylate, uranium(III) acrylate, iron(II) acrylate, chromium(III) acrylate, iron(III) acrylate, cobalt(II) acrylate and nickel(II) acrylate. Examples of other suitable salts are palladium(II) fumarate, osmium(IV) fumarate, iridium(III) fumarate and platinum(II) fumarate. Double salts or mixtures of the said salts may also be used. The salts are preferably used in the anhydrous condition.

The said salts are obtainable by conventional methods, for example by reaction of metal oxides or carbonates with the unsaturated organic carboxylic acids or their anhydrides, for example with maleic acid, maleic anhydride, fumaric acid, itaconic acid, crotonic acid, acrylic acid, methacrylic acid, linoleic acid, linolenic acid or oleic acid.

Conventional polypropylenes, particularly those having an intrinsic viscosity $[\eta]$ of 3 to 20, are suitable for the purposes of the present invention.

Production of the molding material in accordance with this invention may be carried out under conventional conditions in conventional mixing equipment. The molding material may advantageously be prepared in a kneader or screw extruder at working temperatures of from 150° to 300° C., preferably from 170° to 220° C. It is self-evident that the salts of the organic unsaturated carboxylic acids are used in as finely divided a condition as possible or metered in as melts.

The molding material according to this invention may contain conventional additives or auxiliaries for polypropylene molding material, for example dyes, stabilizers and lubricants, in addition to the salts of organic unsaturated carboxylic acids with transition metals and/or metals of Groups II and/or III of the Periodic System of Elements.

The molding material according to this invention may be processed in conventional apparatus into conventional moldings. The molding material is particularly suitable for the production of films, sheeting and sealing members.

The invention is illustrated in the following examples.

EXAMPLE 1

5 parts of anhydrous zinc maleate is incorporated into 95 parts of polypropylene having an intrinsic viscosity $[\eta]=8$ and the mixture is homogenized for five minutes at 200° C. in a kneader. The hot mixture is then processed direct into moldings. The tear resistance of the moldings is 415 kg./sq.m. and the softening point is 170° C. in contrast to 300 kg./sq.m. and 164° C. in the case of analogous moldings which do not contain zinc maleate.

EXAMPLES 2 to 10

The procedure of Example 1 is followed, but with the modifications set out in the following table. Moldings are obtained having the properties given in the table. For comparison, the values for moldings without the additive according to this invention are: a tear resistance of about 303 kg./sq.m. in the case of a polypropylene having $[\eta]=10$, about 306 kg./sq.m. for polypropylene having $[\eta]=12$ and about 310 kg./sq.m. for polypropylene having $[\eta]=14$.

The following abreviations are used in the table: PP=polypropylene; ZF=zinc fumarate; ZA=zinc acrylate; ZO=zinc oleate; ZL=zinc linoleate; ZS=zinc sorbate; AN=aluminum methacrylate; CM=copper maleate; CF=chromium fumarate; LO=lead oleate; MS=metal salt; p.=parts; t.=type; HOM=homogenisation; TR=tear resistance in kg./sq. m.; EL=elongation in percent; SP=softening point in ° C.

TABLE

| No. | PP p. | PP $[\eta]$ | MS p. | MS t. | HOM ° C. | HOM Min. | TR | EL | SP |
|---|---|---|---|---|---|---|---|---|---|
| 2 | 95 | 8 | 5 | ZF | 200 | 5 | 473 | 22 | 169 |
| 3 | 95 | 8 | 5 | ZA | 200 | 5 | 480 | 23 | 170 |
| 4 | 95 | 8 | 5 | ZO | 200 | 5 | 480 | 24 | 170 |
| 5 | 95 | 8 | 5 | ZL | 200 | 5 | 382 | 22 | 169 |
| 6 | 95 | 8 | 5 | ZS | 200 | 5 | 490 | 25 | 170 |
| 7 | 90 | 10 | 10 | AM | 180 | 2 | 480 | 20 | 172 |
| 8 | 85 | 12 | 15 | CM | 190 | 10 | 494 | 18 | 175 |
| 9 | 80 | 12 | 20 | CF | 210 | 15 | 492 | 20 | 179 |
| 10 | 75 | 14 | 25 | LO | 220 | 15 | 469 | 18 | 180 |

I claim:
1. Molding material from polypropylene which contains 5 to 15 parts by weight of anhydrous zinc maleate for each 100 parts by weight of polypropylene.

References Cited

UNITED STATES PATENTS

| | | | |
|---|---|---|---|
| 2,984,634 | 5/1961 | Caldwell et al | 260—23 |
| 3,238,163 | 3/1966 | O'Neill et al. | 260—23 |
| 3,265,649 | 8/1966 | Faltings et al. | 260—23 |
| 3,310,548 | 3/1967 | Karoly et al. | 260—93.7 |

FOREIGN PATENTS

| | | |
|---|---|---|
| 1,235,861 | 5/1960 | France. |
| 648,527 | 5/1964 | Belgium. |

JOSEPH L. SCHOFER, Primary Examiner

S. M. LEVIN, Assistant Examiner

U.S. Cl. X.R.

260—94.9